(12) United States Patent
Tang et al.

(10) Patent No.: US 11,499,852 B1
(45) Date of Patent: Nov. 15, 2022

(54) DEVICE FOR MONITORING UNDERWATER SURFACE OVERFLOW SEEPAGE OF LANDSLIDE AND MONITORING METHOD

(71) Applicant: CHINA UNIVERSITY OF GEOSCIENCES (WUHAN), Wuhan (CN)

(72) Inventors: Huiming Tang, Wuhan (CN); Junrong Zhang, Wuhan (CN); Yongquan Zhang, Wuhan (CN); Changdong Li, Wuhan (CN); Xinli Hu, Wuhan (CN); Liangqing Wang, Wuhan (CN); Chengyuan Lin, Wuhan (CN)

(73) Assignee: CHINA UNIVERSITY OF GEOSCIENCES (WUHAN), Wuhan (CN)

( * ) Notice: Subject to any disclaimer, the term of this patent is extended or adjusted under 35 U.S.C. 154(b) by 0 days.

(21) Appl. No.: 17/402,653

(22) Filed: Aug. 16, 2021

Related U.S. Application Data (63) Continuation of application No. PCT/CN2021/107488, filed on Jul. 21, 2021.

(30) Foreign Application Priority Data

Jun. 11, 2021 (CN) .......................... 202110654858.X (51) Int. Cl.
*G01F 1/66* (2022.01)
*G01L 19/14* (2006.01)

(52) U.S. Cl.
CPC .............. *G01F 1/662* (2013.01); *G01L 19/14* (2013.01)

(58) Field of Classification Search
None
See application file for complete search history.

(56) References Cited

U.S. PATENT DOCUMENTS

| | | |
|---|---|---|
| 7,945,530 B2 | 5/2011 | Bell |
| 8,630,974 B2 | 1/2014 | Bell |
| 10,961,975 B2 | 3/2021 | Novek |

*Primary Examiner* — Harshad R Patel
(74) *Attorney, Agent, or Firm* — True Shepherd LLC; Andrew C. Cheng (57) ABSTRACT

A device for monitoring underwater surface overflow seepage of a landslide includes an underwater seepage monitor arranged on an underwater sliding mass, the underwater seepage monitor includes a bearing housing, a flow guide pipe, a silt discharging cover plate and a silt discharging mechanism, the silt discharging mechanism driving the silt discharging cover plate to be switched between a blocking position and an opening position. Considering complex environmental factors, a multifunctional flow monitor is embedded into a sliding mass and surrounds an outlet of the underwater landslide seepage. A silt discharging hole is provided in the bearing housing, the silt discharging mechanism is configured to drive the silt discharging cover plate to be located at the opening position, and silt in the bearing housing may be discharged from the silt discharging hole, such that the problem of silt deposition caused by overflow seepage of an underwater landslide is solved.

8 Claims, 6 Drawing Sheets

DEVICE FOR MONITORING UNDERWATER SURFACE OVERFLOW SEEPAGE OF LANDSLIDE AND MONITORING METHOD

CROSS-REFERENCE TO RELATED APPLICATIONS

This application is a continuation of International Patent Application No. PCT/CN2021/107488 with a filing date of Jul. 21, 2021, designating the United States, now pending, and further claims priority to Chinese Patent Application No. 202110654858.X with a filing date of Jun. 11, 2021. The content of the aforementioned applications, including any intervening amendments thereto, are incorporated herein by reference.

TECHNICAL FIELD

The present disclosure relates to the technical field of landslide monitoring, and particularly relates to a device for monitoring underwater surface overflow seepage of a landslide and a monitoring method.

BACKGROUND

The reservoir region has complex geological conditions and frequent geological hazards. Under the regulation of reservoir impoundment, the landslide and bank collapse occur frequently, resulting in sizeable impact on life safety and property safety. In the process of landslide deformation, the structure is loosened, so permeability is enhanced, and accordingly, the seepage field around the landslide mass changes. Moreover, the ground fissure and the ponor are developed in the rear edge of the landslide, causing the surface water (irrigation water and rainfall) to directly pour into the slope body, so a large number of landslides are induced. As a result, the spring water is often found at the front edge of the landslide, the flow of which is large at the beginning of the tunnel and gradually tends to be stable. The change of the flow can indirectly reflect the deformation and fracture process of the rock-soil mass. It is an important aspect for landslide prediction and control to advance related monitoring technologies and study the relation between surface water infiltration and the landslide development process.

Massive research has been done on monitoring of surface runoff or surface water flow of the landslide previously. However, landslide underwater overflow seepage is monitored rarely owing to the following main technical difficulties: 1, the flow velocity and rate of the landslide overflowing seepage change in different seasons, which are usually larger in rainy season and smaller in dry season, and fluctuate wildly; 2, since the rock-soil mass medium of the landslide is anisotropic, the spatial distribution position of the underwater overflow seepage of the landslide is difficult to determine, the seepage rates are different at different positions, and distributed unevenly; and 3, as the underwater environment is complex, a tracer method taking reflective substances, a temperature field, a magnetic field, an electric field, etc. as a platform cannot distinguish the difference between the underwater environment, for example, surge, aquatic organisms, etc. and the overflow seepage of the landslide and cannot be directly applied. Moreover, the silt rushing out due to large seepage velocity is prone to deposit in the apparatus to cause blockage. In addition, the monitoring of underwater overflow seepage of the landslide faces the challenges from the water-proof treatment of the monitoring apparatus, the underwater power supply and the reliability and persistence of the monitoring method Therefore, based on features of underwater overflow seepage of the landslide and the limitation of underwater monitoring environment, it is of prominent significance to introduce a set of targeted, high-reliability and low-cost technology for monitoring the underwater surface seepage of the landslide for advancement of distribution estimation of the seepage field of the landslide and the medium-term and long-term prediction theory.

SUMMARY

In view of this, the embodiments of the present disclosure provide a device for monitoring underwater surface overflow seepage of a landslide and a monitoring method.

The embodiment of the present disclosure provides a device for monitoring underwater surface overflow seepage of a landslide, including an underwater seepage monitor arranged on an underwater sliding mass, where the underwater seepage monitor includes a bearing housing, a flow guide pipe, a silt discharging cover plate and a silt discharging mechanism, a top of the bearing housing being sealed and provided with a drainage port penetrating same, and a one-way valve being arranged at the drainage port; a silt blocking net is fixed in the bearing housing to define an embedding chamber and a silt settling cavity one above the other;

the flow guide pipe extends in a vertical direction, an upper end thereof inclines and extends outwards and upwards to form a funnel-shaped upper baffle, a lower end thereof inclines and extends outwards and downwards to form a funnel-shaped lower baffle, ends of the upper baffle and the lower baffle are connected to an inner side wall of the bearing housing in a sealed manner and located below the silt blocking net, a confluence chamber is defined between the upper baffle and the silt blocking net, a silt discharging hole penetrates a side wall of the silt settling cavity, and the silt discharging hole is located below the lower baffle;

the silt discharging cover plate is movably mounted on the bearing housing and is provided with a blocking position at which the silt discharging hole is blocked and an opening position at which the silt discharging hole is opened; and the silt discharging mechanism is fixed to the bearing housing and drives the silt discharging cover plate to be switched between the blocking position and the opening position.

Further, the silt discharging cover plate may be located outside the bearing housing, and the silt discharging mechanism may include a hydraulic oil pump, a hydraulic cylinder, a first connection rod and a second connection rod, the hydraulic oil pump being fixed to the bearing housing, the hydraulic cylinder being fixed to an outer side wall of the bearing housing, and the hydraulic oil pump being connected to the hydraulic cylinder by means of an oil pipe and driving a hydraulic rod of the hydraulic cylinder to extend and retract; and the silt discharging cover plate may be located between the hydraulic rod and the silt discharging hole, in an extending direction of the hydraulic rod, one end, away from the hydraulic cylinder, of the silt discharging cover plate may be hinged to the first connection rod, the other end of the first connection rod may be hinged to the hydraulic rod of the hydraulic cylinder, one end, close to the hydraulic cylinder, of the silt discharging cover plate may be hinged to the second connection rod, the other end of the second connection rod may be hinged to the bearing housing, the second connection rod may be located between the silt discharging cover plate and the hydraulic cylinder, and the hydraulic rod may extend and retract to drive the silt discharging cover plate to rotate between the blocking position and the opening position.

Further, a pressure sensor may be fixed on one side, facing the silt discharging hole, of the silt discharging cover plate, and the pressure sensor may be configured to monitor the amount of silt in the silt settling cavity.

Further, the device for monitoring underwater surface overflow seepage of a landslide may further include a spoiler bowl, where the spoiler bowl may be of a bowl shape and has an opening facing upwards, the spoiler bowl may be fixed in the bearing housing, located below the lower baffle and opposite a water outlet in a lower end of the flow guide pipe, and an upper end of the spoiler bowl may be located above the silt discharging hole; and/or, the device may further include a pressed bottom plate, where a plurality of slots may be provided in a lower surface of the bearing housing, a plurality of insertion feet corresponding to the slots may be fixed to one side of the pressed bottom plate, the other side of the pressed bottom plate may be fixedly connected to one end of a rope, and the insertion feet may be inserted into the slots.

Further, the device for monitoring underwater surface overflow seepage of a landslide may further include a drainage pipe, where a lower end of the drainage pipe may be in communication with a drainage hole, an upper end thereof may be bent outwards to form an annular bent portion, an upper end of the annular bent part may be connected to the inner side wall of the bearing housing in a sealed manner, and a monitoring cavity may be defined by the drainage pipe, the annular bent portion and the bearing housing and configured to contain a monitor.

Further, the monitor may include a pressure-sensitive sensor, the pressure-sensitive sensor being mounted on a bottom wall of the bearing housing and configured to monitor an impact force of underwater surges; and/or, the monitor may include a micro camera, and a transparent observation window may be provided in a side wall of the drainage pipe, the micro camera being mounted on the transparent observation window and configured to photograph soil particles in water flow in the drainage pipe; and/or, an ultrasonic flowmeter may be mounted on the drainage pipe and configured to measure a flow rate of liquid in the drainage pipe.

Further, an integrated circuit board may be fixed in the monitoring cavity, and the integrated circuit board may be electrically connected to the monitor and the hydraulic oil pump and configured to control the monitor and the hydraulic oil pump and collect, process and transmit monitoring data.

Further, the device for monitoring underwater surface overflow seepage of a landslide may further include a ground data center arranged on an overwater sliding mass, where the ground data center may be provided with a control module, the control module being electrically connected to the integrated circuit board to control the underwater seepage monitor to perform monitoring; and/or, the device may further include a ground data center arranged on the overwater sliding mass, where the ground data center may be provided with a data transceiving module, the data transceiving module being electrically connected to the integrated circuit board and capable of acquiring monitoring information of the underwater seepage monitor and transmitting the monitoring information to a mobile monitoring terminal or a network by means of a general packet radio service (GPRS).

Further, the ground data center may be provided with a solar power supply device, the solar power supply device being electrically connected to an electric apparatus in the ground data center and an electric apparatus in the underwater seepage monitor and continuously supplying power in a monitoring process.

The embodiment of the present disclosure further provides a monitoring method, using the above device for monitoring underwater surface overflow seepage of a landslide and including the following steps:

S1, determining a seepage overflow port on a surface of an underwater sliding mass for a landslide needing to be monitored, taking a ship as a carrier, making a top of a bearing housing face downwards, and pressing and embedding an underwater seepage monitor into the underwater sliding mass, wherein the seepage overflow port is located on an inner side of the top of the bearing housing, and arrangement of the underwater seepage monitor of the sliding mass is completed;

S2, arranging a ground data center at a position, close to a surface of a shore sliding mass, of the underwater seepage monitor, mounting a solar power supply device, a data transceiving module and a control module, and electrically connecting the above apparatuses to the underwater seepage monitor by means of a power/control cable, such that the system is arranged completely and starts to work;

S3, connecting the control module to an integrated circuit board to control all assemblies in the underwater seepage monitor of the sliding mass to work, making seepage pass through an embedding chamber, a silt settling cavity and a drainage pipe in sequence after overflowing, wherein silt is gathered in the silt settling cavity, using a silt discharging mechanism to drive a silt discharging cover plate to rotate to an opening position for dredging work, discharging the silt, then using the silt discharging mechanism to drive the silt discharging cover plate to rotate to a blocking position at which a silt discharging hole is blocked, and using a monitor to monitor the seepage in the drainage pipe; and S4, electrically connecting the data transceiving module to the underwater seepage monitor, so as to acquire monitoring information of the underwater seepage monitor and transmit the monitoring information to a mobile monitoring terminal or a network by means of a GPRS.

The technical solution provided in the embodiments of the present disclosure has the beneficial effects that considering complex environmental factors of monitoring of underwater seepage, a multifunctional flow monitor is embedded into a sliding mass and surrounds an outlet of the underwater landslide seepage; a silt discharging hole is provided in a bearing housing, a silt discharging mechanism is configured to drive a silt discharging cover plate to be located at an opening position, and silt in the bearing housing may be discharged from the silt discharging hole, such that the problem of silt deposition caused by overflow seepage of an underwater landslide is solved; and the seepage overflowing from the sliding mass changes a flow velocity when flowing through a confluence chamber and the flow guide pipe and then flowing into a silt settling cavity, so as to facilitate silt accumulation, and meanwhile, the problem about monitoring stability due to environmental water impact is solved, thereby providing a stable environment for monitoring the underwater seepage.

The ultrasonic flowmeter is combined with a photographing type flow velocity monitoring method to expand a monitoring range while guaranteeing monitoring precision, thereby achieving full coverage of monitoring from an extremely low flow velocity to a high flow velocity of the seepage. The device is a resistance-free monitoring device, the seepage has no resistance from collection of port seepage to discharge of tail seepage out of a Tesla valve, and the situation that the seepage side-overflows due to too large resistance of a covering type monitoring apparatus is avoided. Moreover, the present disclosure uses mature technologies, which has high automation degree and high monitoring precision, saves time and labor, has a simple structure and rational design, is economical and efficient, and is convenient to popularize.

In the figures: ground data center 1, solar power supply device 11, data transceiving module 12, control module 13, concrete pier 14, underwater seepage monitor 2, bearing housing 201, embedding portion 2011, pressed bottom plate 2012, rope 2013, ring 2014, insertion foot 2015, slot 2016, power supply hole 202, power/control cable 203, water collection cavity 204, embedding chamber 2041, confluence chamber 2042, silt blocking net 2043, silt settling cavity 205, spoiler bowl 2051, silt discharging hole 2052, pressure sensor 2053, oil pump cavity 206, hydraulic oil pump 2061, oil pipe hole 2062, oil pipe 2063, drainage channel 207, drainage pipe 2071, drainage port 2072, transparent observation window 2073, annular bent portion 2074, monitoring cavity 208, integrated circuit board 2081, pressure-sensitive sensor 2082, ultrasonic flowmeter 2083, micro camera 2084, pressure connector 2085, silt discharging mechanism 209, hydraulic cylinder 2091, hydraulic rod 2092, first connection rod 2093, second connection rod 2094, base 2095, first support seat 2096, second support seat 2097, third support seat 2098, silt discharging cover plate 2099, bottom cover 210, flow guide pipe 211, upper baffle 212, lower baffle 213, water surface 3, and sliding mass 4.

DETAILED DESCRIPTION OF THE EMBODIMENTS

In order to make the objectives, technical solutions and advantages of the present disclosure clearer, the implementations of the present disclosure are described in more detail below with reference to the accompanying drawings.

With reference to FIGS. 1-5, the embodiment of the present disclosure provides a device for monitoring underwater surface overflow seepage of a landslide, including a ground data center 1 arranged on an overwater sliding mass 4 and a plurality of underwater seepage monitors 2 arranged on an underwater sliding mass 4.

Figure 1:
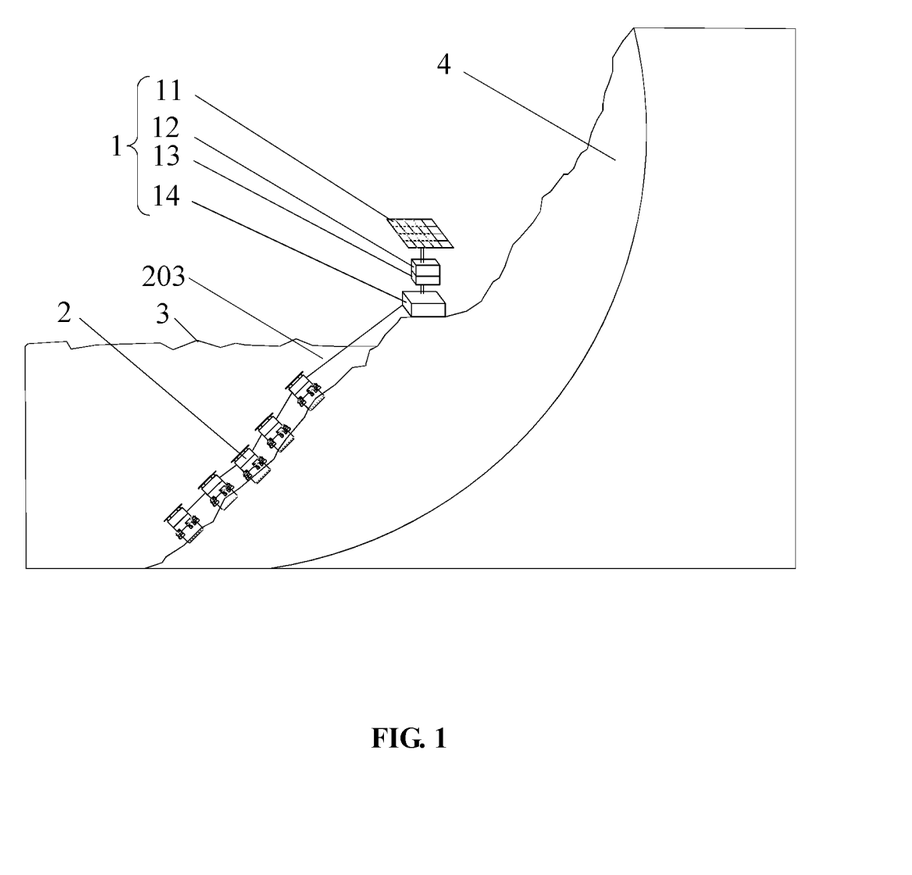
FIG. 1 is a schematic diagram of arrangement of an embodiment of a device for monitoring underwater surface overflow seepage of a landslide provided in the present disclosure.

The ground data center 1 includes a solar power supply device 11, a data transceiving module 12, a control module 13 and a concrete pier 14, where the concrete pier 14 is poured by concrete and located above a water surface 3 and on a surface of the sliding mass 4, and the solar power supply device 11, the data transceiving module 12 and the control module 13 are fixed to the concrete pier 14. The solar power supply device 11 is electrically connected to electric apparatuses (the data transceiving module 12 and the control module 13) in the ground data center 1 and an electric apparatus in the underwater seepage monitor 2 and continuously supplies power in a monitoring process. The data transceiving module 12 is electrically connected to an integrated circuit board 2081 of the underwater seepage monitor 2, so as to acquire monitoring information of the underwater seepage monitor 2 and transmit the monitoring information to a mobile monitoring terminal or a network by means of a general packet radio service (GPRS); and the control module 13 is electrically connected to the integrated circuit board 2081 of the underwater seepage monitor 2 to control the underwater seepage monitor 2 to perform monitoring.

The underwater seepage monitor 2 includes a bearing housing 201, a flow guide pipe 211, a silt discharging cover plate 2099 and a silt discharging mechanism 209. A top of the bearing housing 201 is open, and the top of the bearing housing 201 is sharp to form an embedding portion 2011 used for being pressed into the sliding mass 4, such that the underwater seepage monitor 2 may better penetrate into the sliding mass 4 in a static force manner. A bottom of the bearing housing 201 is sealed and provided with a drainage port 2072 penetrating same, a one-way valve is arranged at the drainage port 2072, and accordingly, water flow may only flow out of the bearing housing 201. In this embodiment, the one-way valve is a Tesla valve, water may flow out of the bearing housing 201 without resistance, but the water has resistance when flowing into the bearing housing 201. A silt blocking net 2043 is fixed in the bearing housing 201 to define an embedding chamber 2041 and a silt settling cavity 205 one above the other, the silt blocking net 2043 is configured to prevent larger silt blocks or gravels from entering the silt settling cavity 205, and the bearing housing 201 and the embedding chamber 2041 are arranged in a cylindrical shape with a diameter being about 1 m.

Figure 5:
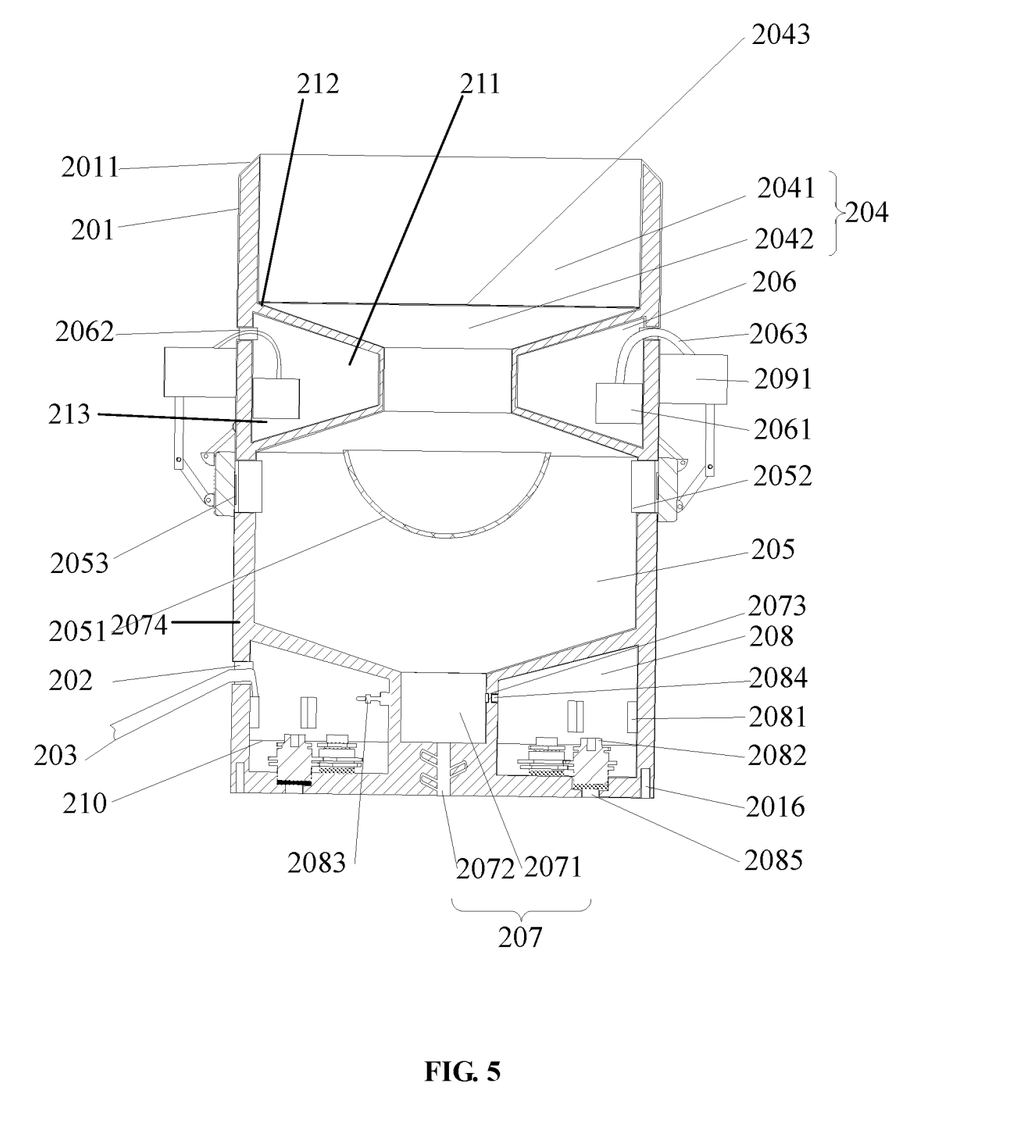
FIG. 5 is an axial cutaway view of the underwater seepage monitor of FIG. 1.

The flow guide pipe 211 extends in a vertical direction, an upper end thereof inclines and extends outwards and upwards to form a funnel-shaped upper baffle 212, a lower end thereof inclines and extends outwards and downwards to form a funnel-shaped lower baffle 213, ends of the upper baffle 212 and the lower baffle 213 are connected to an inner side wall of the bearing housing 201 in a sealed manner and located below the silt blocking net 2043, a confluence chamber 2042 is defined between the upper baffle 212 and the silt blocking net 2043, a funnel opening in a bottom of the confluence chamber 2042 has a diameter about 20 cm, which is mainly configured to collect seepage overflowing from the sliding mass 4, and the confluence chamber 2042 and the embedding chamber 2041 are combined to form a water collection cavity 204. Based on the Bernoulli effect, under the condition that a pipe diameter is increased, a flow velocity is reduced, accordingly, the seepage is slowed down, and part of silt may sink and deposit. The top of the bearing housing 201 is embedded into the sliding mass 4, a rock-soil mass of the sliding mass 4 is located in the embedding chamber 2041, the seepage overflowing from the sliding mass 4 starts from the embedding chamber 2041, and is filtered by the silt blocking net 2043 and converged in the confluence chamber 2042, and since a pipe diameter of the lower baffle 213 is gradually increased, the seepage is slowed down after flowing through the flow guide pipe 211, and the silt may sink and deposit in the lower baffle 213.

A silt discharging hole 2052 penetrates a side wall of the silt settling cavity 205, and the silt discharging hole 2052 is located below the lower baffle 213 and configured to discharge the silt settled in the silt settling cavity 205, and a plurality of silt discharging holes 2052 may increase a silt discharging velocity. In this embodiment, the four silt discharging holes 2052 are distributed in a circumferential direction of the bearing housing 201 at equal intervals, so the silt may be evenly discharged from all directions.

A spoiler bowl 2051 is arranged in the silt settling cavity 205, the spoiler bowl 2051 is of a bowl shape and has an opening facing upwards, the spoiler bowl 2051 is fixed in the bearing housing 201, located below the lower baffle 213 and opposite a water outlet in a lower end of the flow guide pipe 211, and an upper end of the spoiler bowl 2051 is located above the silt discharging hole 2052. After the silt flowing along with the seepage flows out of the flow guide pipe 211, the spoiler bowl 2051 directly facing the funnel opening in the bottom of the confluence chamber 2042 stops the silt with large particle size from flowing, and the silt is collected at the lower baffle 213 and prevented from flowing out of the bottom of the bearing housing 201 along with the seepage.

Figure 2:
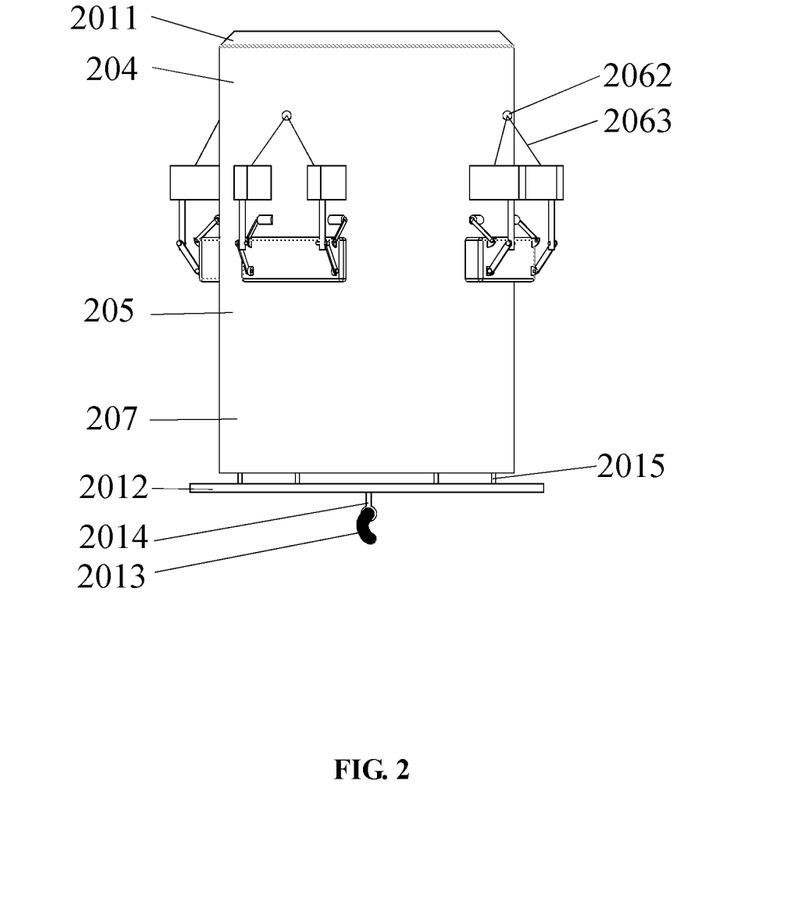
FIG. 2 is a schematic diagram of appearance of an underwater seepage monitor of FIG. 1.
Figure 4:
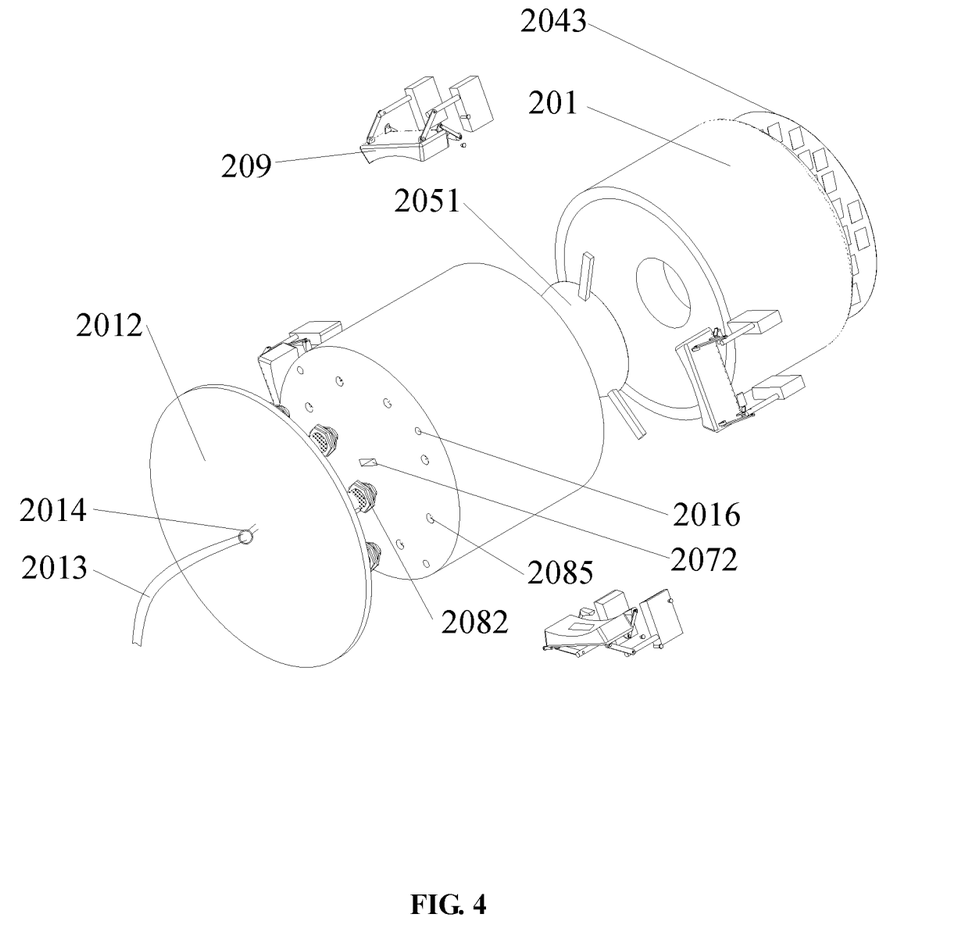
FIG. 4 is an exploded view of an underwater seepage monitor of FIG. 1.

The silt discharging cover plate 2099 is movably mounted on the bearing housing 201 and is provided with a blocking position at which the silt discharging hole 2052 is blocked and an opening position at which the silt discharging hole 2052 is opened, and the plurality of silt discharging cover plates 2099 correspond to the silt discharging holes 2052 in a one-to-one manner. The silt discharging cover plate 2099 is of a U shape for adapting to the bearing housing 201. The plurality of silt discharging mechanisms 209 correspond to the silt discharging cover plates 2099, are fixed to the bearing housing 201 and drive the silt discharging cover plates 2099 to be switched between the blocking positions and the opening positions.

In other embodiments, the silt discharging cover plate 2099 may move up and down to be mounted on the inner side wall of the bearing housing 201, and the silt discharging mechanism 209 may be a hydraulic cylinder to drive the silt discharging cover plate 2099 to move up and down to block and open the silt discharging hole 2052. In this embodiment, the silt discharging cover plate 2099 is located outside the bearing housing 201, so the silt discharging cover plate 2099 may be prevented from being influenced by silt in the bearing housing 201 during movement.

Figure 3:
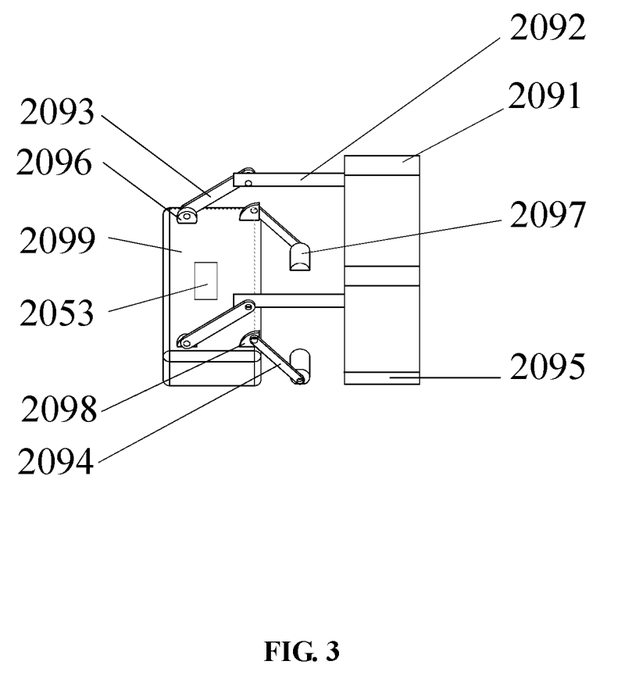
FIG. 3 is a structural schematic diagram of a silt discharging mechanism of FIG. 1.

The silt discharging mechanism 209 includes a hydraulic oil pump 2061, a hydraulic cylinder 2091, a first connection rod 2093 and a second connection rod 2094.

The hydraulic oil pump 2061 is fixed to the bearing housing 201, specifically, an oil pump cavity 206 is defined among the flow guide pipe 211, the upper baffle 212, the lower baffle 213 and the bearing housing 201, the hydraulic oil pump 2061 is mounted in the oil pump cavity 206, a plurality of oil pipe holes 2062 allowing oil pipes 2063 to penetrate are provided in a side wall of the oil pump cavity 206 and correspond to the plurality of silt discharging mechanisms 209 in a one-to-one manner, and a gap between the oil pipe 2063 and the oil pipe hole 2062 is subject to waterproof treatment.

The hydraulic cylinder 2091 is fixed to an outer side wall of the bearing housing 201 (fixed to a base 2095 of the bearing housing 201), the hydraulic oil pump 2061 is connected to the hydraulic cylinder 2091 by means of an oil pipe 2063 and drives a hydraulic rod 2092 of the hydraulic cylinder 2091 to extend and retract. The silt discharging cover plate 2099 is located between the hydraulic rod 2092 and the silt discharging hole 2052, in an extending direction of the hydraulic rod 2092, one end, away from the hydraulic cylinder 2091, of the silt discharging cover plate 2099 is hinged to the first connection rod 2093 (the first connection rod 2093 is hinged to a first support seat 2096 fixed on the silt discharging cover plate 2099), the other end of the first connection rod 2093 is hinged to the hydraulic rod 2092 of the hydraulic cylinder 2091, one end, close to the hydraulic cylinder 2091, of the silt discharging cover plate 2099 is hinged to the second connection rod 2094 (the second connection rod 2094 is hinged to a third support seat 2098 fixed on the silt discharging cover plate 2099), the other end of the second connection rod 2094 is hinged to the bearing housing 201 (hinged to a second support seat 2097 of the bearing housing 201), the second connection rod 2094 is located between the silt discharging cover plate 2099 and the hydraulic cylinder 2091, and the hydraulic rod 2092 extends and retracts to drive the silt discharging cover plate 2099 to rotate between the blocking position and the opening position.

When the hydraulic rod 2092 retracts, the first connection rod 2093 and the second connection rod 2094 are driven to move to pull the silt discharging cover plate 2099 up, and at the moment, the silt deposited therein is discharged from the silt discharging hole 2052 under the action of gravity. When the hydraulic rod 2092 extends, the silt discharging cover plate 2099 returns again to block the silt discharging hole 2052, where a rubber ring is arranged on an inner side of the silt discharging cover plate 2099 to guarantee sealing between the silt discharging cover plate 2099 and the silt discharging hole 2052. In this embodiment, the hydraulic rod 2092 extends up and down, the hydraulic cylinder 2091 is located above the silt discharging cover plate 2099, the hydraulic rod 2092 extends and retracts to drive a lower end of the silt discharging cover plate 2099 to rotate around an upper end of the silt discharging cover plate 2099, and each of the silt discharging cover plates 2099 is correspondingly provided with two silt discharging mechanisms 209 which are fixed to a left side and a right side of the silt discharging cover plate 2099 separately, so as to improve rotation stability of the silt discharging cover plate 2099 and guarantee a blocking effect of the silt discharging cover plate 2099 on the silt discharging hole 2052.

Further, a pressure sensor 2053 is fixed to the side, facing the silt discharging hole 2052, of the silt discharging cover plate 2099 and configured to monitor the amount of silt in the silt settling cavity 205, and when the weight of the silt reaches a certain threshold value, the silt discharging mechanism 209 starts to work, and the silt in the silt settling cavity 205 is discharged to avoid the influence of excessive silt on the flowing of the seepage overflowing from the sliding mass 4 in the bearing housing 201.

A drainage pipe 2071 is further arranged in the bearing housing 201, a lower end of the drainage pipe 2071 is in communication with a drainage hole 2072, an upper end thereof is bent outwards to form an annular bent portion 2074, an upper end of the annular bent portion 2074 is connected to the inner side wall of the bearing housing 201 in a sealed manner, the drainage pipe 2071 and the drainage hole 2072 form a drainage channel 207, and a monitoring cavity 208 is defined by the drainage pipe 2071, the annular bent portion 2074 and the bearing housing 201, internally has a water-free environment, and is configured to contain an integrated circuit board 2081 and a monitor.

The monitor includes a pressure-sensitive sensor 2082, a micro camera 2084, and an ultrasonic flowmeter 2083.

The pressure-sensitive sensor 2082 is mounted on a bottom wall of the bearing housing 201 and configured to monitor an impact force of underwater surges, and specifically, a pressure connector 2085 of the pressure-sensitive sensor 2082 is circumferentially mounted on a bottom cover 210 of the bearing housing 201 and is subjected to waterproof treatment.

A transparent observation window 2073 is provided in a side wall of the drainage pipe 2071, the micro camera 2084 is mounted on the transparent observation window 2073 and configured to photograph soil particles in water flow in the drainage pipe 2071. The micro camera 2084 is provided with a light emitting diode (led) lamp, when the seepage flows slowly, the micro soil particles in slow water flow in the drainage pipe 2071 may be photographed at intervals, and a flow velocity of the water flow is determined by means of a moving distance of the soil particles in a fixed time difference.

The ultrasonic flowmeter 2083 is mounted on the drainage pipe 2071 and configured to measure a flow rate of liquid in the drainage pipe 2071. In this embodiment, the ultrasonic flowmeter 2083 is a clamp-on or pipe section type ultrasonic flowmeter, and when the seepage flows rapidly, the flow of liquid in the drainage pipe 2071 may be measured by using an advanced multi-pulse technology, a signal digital processing technology and an error correction technology according to a principle of a "velocity difference method".

The integrated circuit board 2081 is electrically connected to the monitor (the pressure-sensitive sensor 2082, the micro camera 2084 and the ultrasonic flowmeter 2083) and the hydraulic oil pump 2061, and the integrated circuit board 2081 includes a single chip microcomputer and is configured to control the monitor and the hydraulic oil pump 2061 and collect, process and transmit monitoring data.

A power supply hole 202 penetrates a position, corresponding to the monitoring cavity 208, of the bearing housing 201 so as to allow a power/control cable 203 to penetrate, and the power/control cable 203 is electrically connected to all electric driving components in the underwater seepage monitor 2.

The underwater seepage monitor 2 further includes a pressed bottom plate 2012, where a plurality of slots 2016 are provided in a lower surface of the bearing housing 201, a plurality of insertion feet 2015 corresponding to the slots 2016 are fixed to one side of the pressed bottom plate 2012, the other side of the pressed bottom plate 2012 is fixedly connected to one end of a rope 2013, and the insertion feet 2015 are inserted into the slots 2016. In this embodiment, there are four insertion feet 2015 for temporary use during arrangement. The pressed bottom plate 2012 is configured to be pressed so as to make the underwater seepage monitor 2 penetrate into the sliding mass 4 and meanwhile to protected the monitor at the bottom of the instrument. Specifically, a ring 2014 is arranged at a center of the pressed bottom plate 2012, a rope 2013 is tied on the ring 2014, and after the underwater seepage monitor 2 penetrates into the sliding mass 4, the pressed bottom plate 2012 may be removed by pulling the rope 2013 to arrange the instrument.

Figure 6:
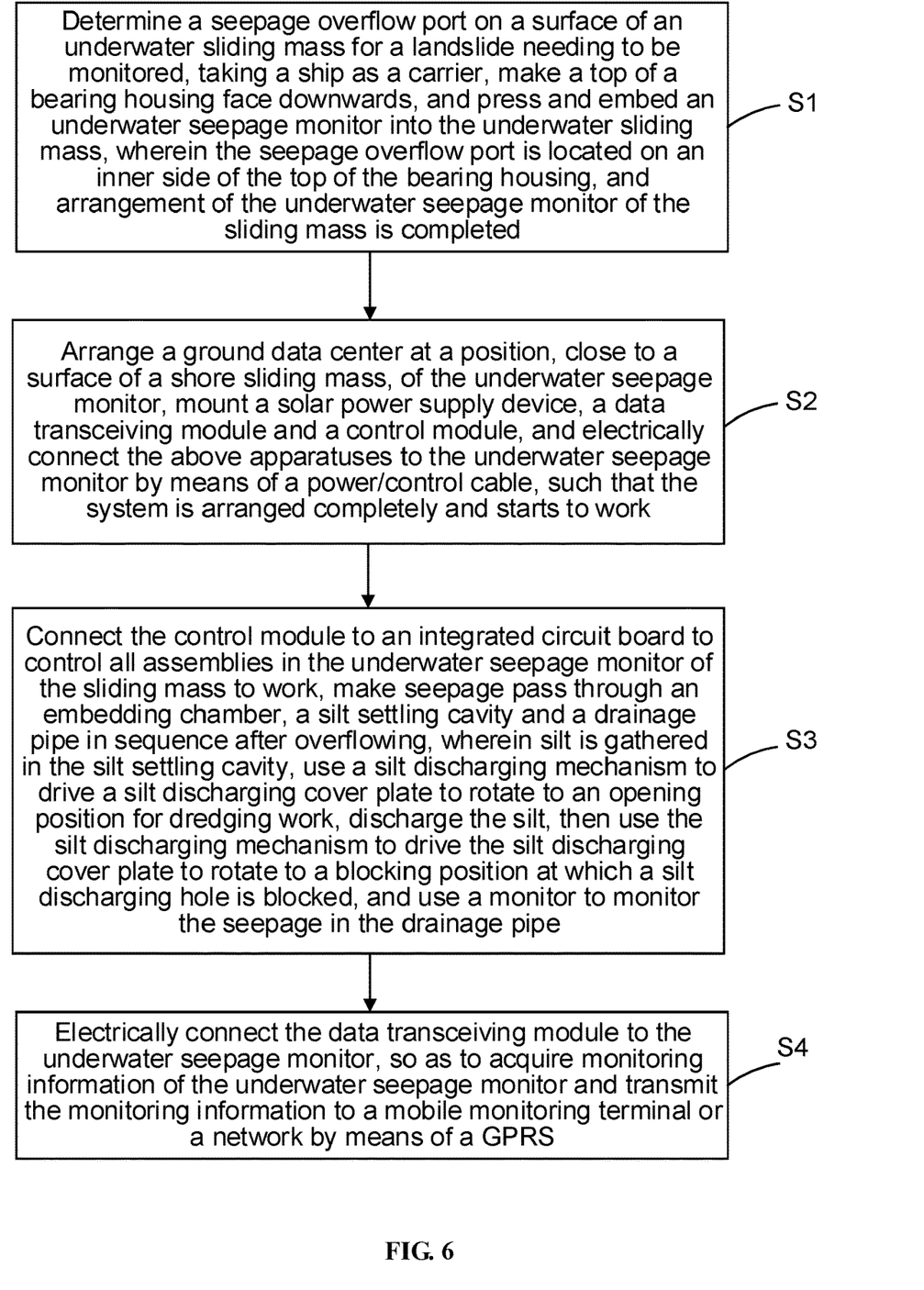
FIG. 6 is a schematic diagram of a flowchart of a monitoring method provided in the present disclosure.

With reference to FIG. 6, a monitoring method based on the above device for monitoring underwater surface overflow seepage of a landslide includes:

S1, a seepage overflow port on a surface of an underwater sliding mass 4 is determined by means of a tracer agent and other survey means or an underwater robot for a landslide needing to be monitored, a ship is taken as a carrier, a top of a bearing housing 201 faces downwards, and an underwater seepage monitor 2 is pressed and embedded into the underwater sliding mass 4 by pressing a pressed bottom plate 2012 mounted at a bottom of the bearing housing 201 by means of a pile driver, where the seepage overflow port is located on an inner side of the top of the bearing housing 201, and a rope 2013 tied on a ring 2014 is pulled to remove the pressed bottom plate 2012 to arrange the underwater seepage monitor 2 of the sliding mass 4.

S2, a ground data center 1 is arranged at a position, close to a surface of a shore sliding mass 4, of the underwater seepage monitor 2, specifically, a concrete pier 14 is poured and provided with a solar power supply device 11, a data transceiving module 12 and a control module 13, and the above apparatuses are electrically connected to the underwater seepage monitor 2 by means of a power/control cable 203, such that the system is arranged completely and starts to work.

S3, the control module 13 is connected to an integrated circuit board 2081 to control all assemblies in the underwater seepage monitor 2 of the sliding mass 4 to work, including frequency monitoring, sensor data processing, etc. Seepage passes through an embedding chamber 2041, a silt settling cavity 205 and a drainage pipe 2071 in sequence after overflowing, where silt is gathered in the silt settling cavity 205, a silt discharging mechanism 209 is used to drive a silt discharging cover plate 2099 to rotate to an opening position, the silt discharging mechanism 209 around the silt settling cavity 205 monitors the amount of the silt according to a pressure sensor 2053 on an inner side of the silt discharging cover plate 2099 to carry out dredging work, the silt is discharged, then the silt discharging mechanism 209 is used to drive a silt discharging cover plate 2099 to rotate to a blocking position at which a silt discharging hole 2052 is blocked, and a monitor is used to monitor the seepage in a drainage pipe 2071; and specifically, the ultrasonic flowmeter 2083 and the micro camera 2084 simultaneously monitor a flow velocity of the seepage in the drainage pipe 2071, so a monitoring coverage range is wide. The pressure-sensitive sensor 2082 continuously monitors an impact force of underwater surges to obtain an actual situation of impact erosion borne by the underwater sliding mass 4 at the position.

S4, the data transceiving module 12 is electrically connected to the underwater seepage monitor 2, so as to acquire monitoring information of the underwater seepage monitor 2 and transmit the monitoring information to a mobile monitoring terminal or a network by means of a GPRS.

In the technical solution provided in the present disclosure, considering complex environmental factors of monitoring of underwater seepage, a multifunctional flow monitor is embedded into a sliding mass 4 and surrounds an outlet of the underwater landslide seepage; a silt discharging hole 2052 is provided in a bearing housing 201, a silt discharging mechanism 209 is configured to drive a silt discharging cover plate 2099 to be located at an opening position, and silt in the bearing housing 201 may be discharged from the silt discharging hole 2052, such that the problem of silt deposition caused by overflow seepage of an underwater landslide is solved; and the seepage overflowing from the sliding mass 4 changes a flow velocity when flowing through a confluence chamber 2042 and the flow guide pipe 211 and then flowing into a silt settling cavity 205, so as to facilitate silt accumulation, and meanwhile, the problem about monitoring stability due to environmental water impact is solved, thereby providing a stable environment for monitoring the underwater seepage.

The ultrasonic flowmeter 2083 is combined with a photographing type flow velocity monitoring method to expand a monitoring range while guaranteeing monitoring precision, thereby achieving full coverage of monitoring from an extremely low flow velocity to a high flow velocity of the seepage. The device is a resistance-free monitoring device, the seepage has no resistance from collection of port seepage to discharge of tail seepage out of a Tesla valve, and the situation that the seepage side-overflows due to too large resistance of a covering type monitoring apparatus is avoided. Moreover, the present disclosure uses mature technologies, which has high automation degree and high monitoring precision, saves time and labor, has a simple structure and rational design, is economical and efficient, and is convenient to popularize.

Herein, the involved terms front, rear, upper, lower, etc., are defined in terms of the positions of parts and between the parts in the drawings, just for clarity and convenience of expressing the technical solution. It should be understood that the use of such parties should not limit the scope of protection of the claimed application.

The above embodiments and the features of the embodiments herein may be combined with each other without conflict.

The above embodiment is merely a preferred embodiment of the present disclosure but not intended to limit the present disclosure, and any modifications, equivalent replacements, improvements, etc. made within the spirit and principles of the present disclosure should be comprised within the scope of protection of the present disclosure.

What is claimed is:

1. A device for monitoring underwater surface overflow seepage of a landslide, comprising an underwater seepage monitor arranged on an underwater sliding mass, and a drainage pipe;

wherein the underwater seepage monitor comprises a bearing housing, a flow guide pipe, a silt discharging cover plate and a silt discharging mechanism, a top of the bearing housing being open, a bottom thereof being sealed and provided with a drainage port penetrating same, and a one-way valve being arranged at the drainage port; a silt blocking net is fixed in the bearing housing to define an embedding chamber and a silt settling cavity one above the other;

the flow guide pipe extends in a vertical direction, an upper end thereof inclines and extends outwards and upwards to form a funnel-shaped upper baffle, a lower end thereof inclines and extends outwards and downwards to form a funnel-shaped lower baffle, ends of the upper baffle and the lower baffle are connected to an inner side wall of the bearing housing in a sealed manner and located below the silt blocking net, a confluence chamber is defined between the upper baffle and the silt blocking net, a silt discharging hole penetrates a side wall of the silt settling cavity, and the silt discharging hole is located below the lower baffle;

the silt discharging cover plate is movably mounted on the bearing housing and is provided with a blocking position at which the silt discharging hole is blocked and an opening position at which the silt discharging hole is opened; and the silt discharging mechanism is fixed to the bearing housing and drives the silt discharging cover plate to be switched between the blocking position and the opening positions;

a lower end of the drainage pipe is in communication with the drainage port, an upper end thereof is bent outwards to form an annular bent portion, an upper end of the annular bent part is connected to the inner side wall of the bearing housing in a sealed manner, and a monitoring cavity is defined by the drainage pipe, the annular bent portion and the bearing housing and is configured to contain a monitor;

the monitor comprises a pressure-sensitive sensor, the pressure-sensitive sensor being mounted on a bottom wall of the bearing housing and configured to monitor an impact force of underwater surges, the monitor further comprises a micro camera, and a transparent observation window is provided in a side wall of the drainage pipe, the micro camera being mounted on the transparent observation window and configured to photograph soil particles in water flow in the drainage pipe, and an ultrasonic flowmeter is mounted on the drainage pipe and configured to measure a flow rate of liquid in the drainage pipe.

2. The device according to claim 1, wherein the silt discharging cover plate is located outside the bearing housing, and the silt discharging mechanism comprises a hydraulic oil pump, a hydraulic cylinder, a first connection rod and a second connection rod, the hydraulic oil pump being fixed to the bearing housing, the hydraulic cylinder being fixed to an outer side wall of the bearing housing, and the hydraulic oil pump being connected to the hydraulic cylinder by means of an oil pipe and driving a hydraulic rod of the hydraulic cylinder to extend and retract; and the silt discharging cover plate is located between the hydraulic rod and the silt discharging hole, in an extending direction of the hydraulic rod, one end, away from the hydraulic cylinder, of the silt discharging cover plate is hinged to the first connection rod, the other end of the first connection rod is hinged to the hydraulic rod of the hydraulic cylinder, one end, close to the hydraulic cylinder, of the silt discharging cover plate is hinged to the second connection rod, the other end of the second connection rod is hinged to the bearing housing, the second connection rod is located between the silt discharging cover plate and the hydraulic cylinder, and the hydraulic rod extends and retracts to drive the silt discharging cover plate to rotate between the blocking position and the opening position.

3. The device according to claim 2, wherein a pressure sensor is fixed on one side, facing the silt discharging hole, of the silt discharging cover plate, and the pressure sensor is configured to monitor the amount of silt in the silt settling cavity.

4. The device according to claim 1, further comprising a spoiler bowl, wherein the spoiler bowl is of a bowl shape and has an opening facing upwards, the spoiler bowl is fixed in the bearing housing, located below the lower baffle and opposite a water outlet in a lower end of the flow guide pipe, and an upper end of the spoiler bowl is located above the silt discharging hole; and/or, further comprising a pressed bottom plate, wherein a plurality of slots are provided in a lower surface of the bearing housing, a plurality of insertion feet corresponding to the slots are fixed to one side of the pressed bottom plate, the other side of the pressed bottom plate is fixedly connected to one end of a rope, and the insertion feet are inserted into the slots.

5. The device according to claim 1, wherein an integrated circuit board is fixed in the monitoring cavity, and the integrated circuit board is electrically connected to the monitor and the hydraulic oil pump and configured to control the monitor and the hydraulic oil pump and collect, process and transmit monitoring data.

6. The device according to claim 5, further comprising a ground data center arranged on an overwater sliding mass, wherein the ground data center is provided with a control module, the control module being electrically connected to the integrated circuit board to control the underwater seepage monitor to perform monitoring; and/or, further comprising a ground data center arranged on the overwater sliding mass, wherein the ground data center is provided with a data transceiving module, the data transceiving module being electrically connected to the integrated circuit board and capable of acquiring monitoring information of the underwater seepage monitor and transmitting the monitoring information to a mobile monitoring terminal or a network by means of a general packet radio service (GPRS).

7. The device according to claim 6, wherein the ground data center is provided with a solar power supply device, the solar power supply device being electrically connected to an electric apparatus in the ground data center and an electric apparatus in the underwater seepage monitor and continuously supplying power in a monitoring process.

8. A monitoring method, using the device for monitoring underwater surface overflow seepage of a landslide according to claim 7 and comprising:

S1, determining a seepage overflow port on a surface of an underwater sliding mass for a landslide needing to be monitored, taking a ship as a carrier, making a top of a bearing housing face downwards, and pressing and embedding an underwater seepage monitor into the underwater sliding mass, wherein the seepage overflow port is located on an inner side of the top of the bearing housing, and arrangement of the underwater seepage monitor of the sliding mass is completed;

S2, arranging a ground data center at a position, close to a surface of a shore sliding mass, of the underwater seepage monitor, mounting a solar power supply device, a data transceiving module and a control module, and electrically connecting the above apparatuses to the underwater seepage monitor by means of a power/control cable, such that the system is arranged completely and starts to work;

S3, connecting the control module to an integrated circuit board to control all assemblies in the underwater seepage monitor of the sliding mass to work, making seepage pass through an embedding chamber, a silt settling cavity and a drainage pipe in sequence after overflowing, wherein silt is gathered in the silt settling cavity, using a silt discharging mechanism to drive a silt discharging cover plate to rotate to an opening position for dredging work, discharging the silt, then using the silt discharging mechanism to drive the silt discharging cover plate to rotate to a blocking position at which a silt discharging hole is blocked, and using a monitor to monitor the seepage in the drainage pipe; and S4, electrically connecting the data transceiving module to the underwater seepage monitor, so as to acquire monitoring information of the underwater seepage monitor and transmit the monitoring information to a mobile monitoring terminal or a network by means of a GPRS.

* * * * *